Sept. 27, 1927.
S. ASHDOWN
1,643,361
AUTOMATIC RELEASING CHOKER HOOK
Filed March 17, 1927
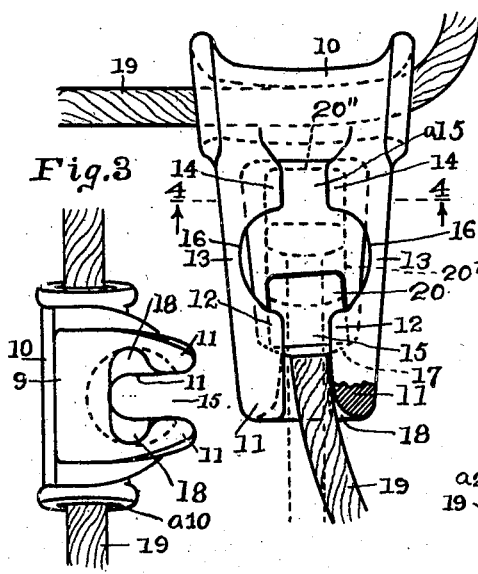
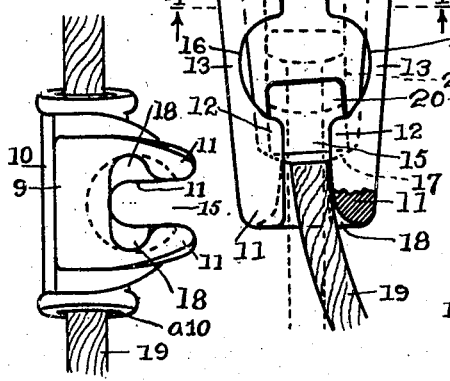
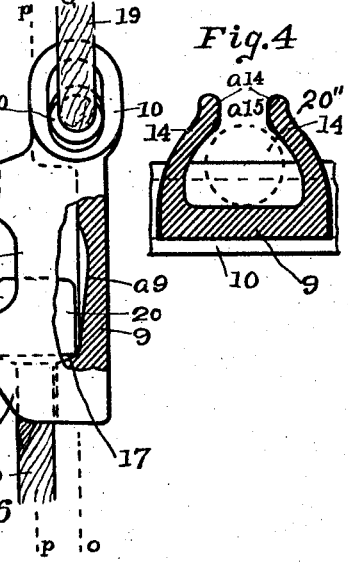
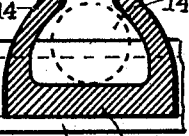
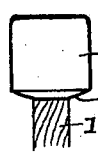
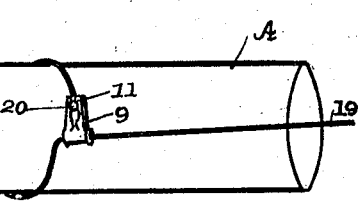
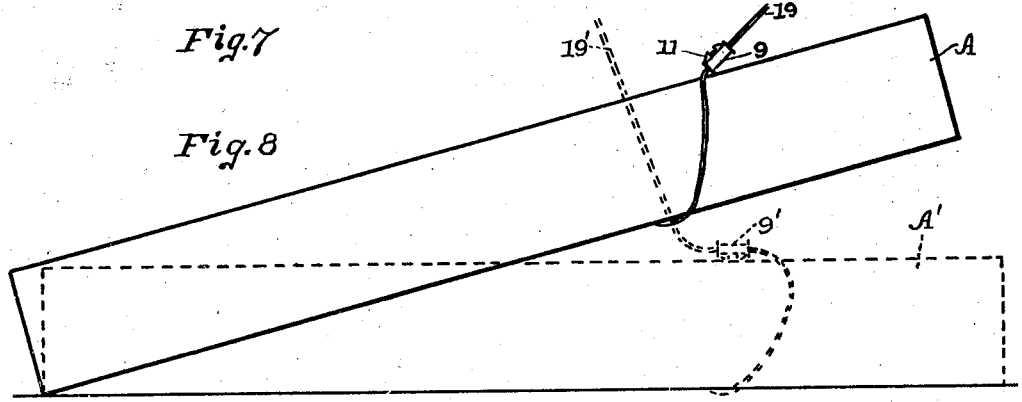
INVENTOR,
Sydney Ashdown.
BY David E. Lain,
ATTORNEY.

Patented Sept. 27, 1927.

1,643,361

UNITED STATES PATENT OFFICE.

SYDNEY ASHDOWN, OF VICTORIA, BRITISH COLUMBIA, CANADA.

AUTOMATIC RELEASING CHOKER HOOK.

Application filed March 17, 1927. Serial No. 176,010.

My invention relates to improvements in automatic releasing choker hooks used in logging, and the main object of my improvement is to provide a choker hook which will be released by the usual operations in connection with landing a log in the yard and providing slack for unfastening it, yet which is unlikely to be unfastened by the slack sometimes occurring during hauling the log to the yard. The latter happens under circumstances which are likely to provide little slack in the tag and choker lines because of the great resilience of the overhead line system, while in the former case ample slack is purposely provided to remove the strain from the supporting cables and also allow sufficient slack in the tag and choker lines to make the unfastening of the choker easy.

I attain this and other objects of my improvement with the device illustrated in the accompanying sheet of drawings, which form a part of this specification, and in which Figure 1 is a front elevation of my choker hook with one end of the choker line engaged therewith and with the choker line extended through the choker eye sleeve but with the loop in the line to enclose the log and also the end of the line to engage with the bull hook broken away. Fig. 2 is a side elevation of Fig. 1. Fig. 3 is a bottom plan view of my choker hook with the choker line extended through the eye sleeve but otherwise broken away. Fig. 4 is a horizontal section of Fig. 1 on the line 4—4. Fig. 5 is an elevation view of the knobbed end of the choker cable. And Fig. 6 is a bottom plan view of Fig. 5.

My illustrations also include Figures 7 and 8 drawn on a smaller scale and showing, respectively, plan and elevation views of a log engaged by a choker line fastened by one of my choker hooks in which one end only of the choker line is shown for lack of space.

Similar characters refer to similar parts throughout. Certain parts are broken away to show other parts hidden thereby.

With particular reference to the several related parts of my improvement: The plate or back frame member of my hook 9 has the eye sleeve 10 transversally and integral therewith on the upper end thereof. Eye $a^{10}$ is extended through said sleeve and shaped to make easy movement of the choker cable therethrough and lessen likelihood of said cable kinking at the ends thereof. Preferably the inner or front surface of plate 9 lies in a central plane longitudinally through eye $a^{10}$ as indicated by line $o$—$q$ in Fig. 2.

Two bosses 11, 11 project forward from the lower end of plate 9 with space 15 therebetween. Bosses 11 are the jaws of the hook and on their upper surfaces is seat 17 provided for the knob or ferrule of the choker line. Upward and thinner extensions 12, 12 of jaws 11 are integral with ribs 13, 13 which extend along the outer edges of plate 9 to overhanging bosses 14, 14 which are integral therewith and also integral with sleeve 10. The lower corners of bosses 14 are turned foreward at $a^{14}$, $a^{14}$. Said overhanging lugs 14 have space $a^{15}$ between their proximate edges. The outer edges of the ribs 13 are of reduced thickness at 16, 16 to provide greater space therebetween. Transverse rounded grooves 18, 18 are provided in the bottom edges of jaws 17 to provide easy shapes for the choker cable to conform to when bearing thereon, and also to engage therein and retain the cable knob more positively on its seat during operation when a small amount of cable slack only is provided.

To one end of choker cable or line 19 is fastened knob or ferrule 20. The other end of said choker cable may have an eye spliced therein or a similar knob fastened thereto depending on the character of the bull hook to which it is intended for connection. This end of the choker line is not shown. Knob 20 is preferably cylindrical in shape with a convex lower end $a^{20}$. Slot 15 between jaws 11 is wide enough to admit cable 19 therein but too narrow for knob 20 to pass therethrough. Bosses 12, 12 are thin enough to permit knob 20 between them and back plate 9, while ribs 13 have sufficient space between for said knob, which therefore is free to seat on top of jaws 11 where a concave seat 17 is provided for the convex end $a^{20}$ of knob 20. A recess $a^9$ is provided in the front surface of plate 9 to allow plenty of room for the cable knob 20 to enter and leave engagement with the hook. Also, all corners and surfaces with which the knob and cable may contact during use are preferably rounded to make movement thereover free and easy.

The space between the walls of bosses 14, 14 and plate 9 is sufficient for knob 20 to enter and the space $a^{15}$ is too small for said knob to pass therethrough as shown in Fig. 4.

With cable 19 and knob 20 engaged with the hook as shown in Figs. 1 and 2 said engagement will continue till the knob is moved upward to position 20' when it is free to leave the hook either by movement forward through parallel positions or by being turned endwise by revolution with the cable through an angle of 90°, either of which movements will free the cable from slot 15. To engage the cable with the hook the above stated movements of cable and knob are reversed. When fastening a line to a log with this hook it is placed on the log A, as shown in Figs. 7 and 8, and the knobbed end of the cable is passed beneath the log and brought over the other side thereof when the knob is caused to enter the hook between ribs 13 at enlargement 16 while the cable passes into slot 15. To do this only sufficient slack in the loop around the log is required to allow the knob to pass above bosses or lugs 12 which in practice is about one half an inch. Once the knob is within the hook with this small amount of slack in the loop it is seated on the jaws 11 and may be left by the operative with the assurance that it is unlikely to become disengaged of itself till strain is put on the choker line when it will become firmly engaged with the hook and so remain till loosening slack is provided in the cable loop around the log. However, if in adjusting the loop around log A more than the required amount of slack is provided in the loop, knob 20 is inserted beneath lugs 14 at 20″ and cable 19 placed in slot 15 and then the operative may safely leave the hook for the following operative tension on the choker line, which, when it comes, will surely cause knob 20 to pass from its position shown at 20″ to its full-line position at 20 in Figs. 1 and 2 where it is properly seated for retaining the hold of the cable on the log. For those not familiar with sky-line logging in the Northwest attention is called to the size and consequent stiffness of the choker cables employed which usually are 1¼ inches in diameter. This relative rigidity of the line requires different shapes of hook to attain a desired objective than if a smaller and more flexible line were employed. The proper working of my hook depends on normal logging methods as now followed in the Northwest woods.

Figs. 7 and 8 have been referred to above as illustrative of the conditions under which the choker cable is placed around a log and then engaged with the hook. They do not fairly represent this situation as they show a log being trailed with the choker cable regularly engaged near one end.

However, to those familiar with the use of these modern logging hooks, no especial illustration will be required that they may fully understand what is described.

On reaching the yard the log is lowered to the ground as at A' and slack enough is allowed in the hauling line and in the tag and choker lines to cause the choker line to fall backwards to the position shown at 19'. The slackened condition of line 19 allows it to slip through sleeve 10 of the hook and become thus loosened in its loop around the log. This will ease the knob on the seat and usually allow it to pass into enlarged opening 16 between ribs 13 and above lugs 12. When said hauling lines were fully slackened, as described, the backward throw of the hauling end of the choker line 16 and the tag and hauling lines, not shown, will, in a hook constructed as shown, cause the hook to turn over on the log as shown at 9' in Fig. 8, with back plate 9 uppermost. When in this position with knob 20 lying in enlarged opening 16 the knob falls out of the hook on to the log and a subsequent pull on the choker line 19 will find the hook disengaged and the choker line free to follow the pull and be drawn clear of the log. Sometimes a shaking of the lines may be needed to fully free the knob from the hook. This agitation may be done by the rapid succession of hauling and slackening movements in the lines by the donkey drums or by an operative near the log. In most instances my hook is automatically releasable in the manner described. In those cases when it fails thus to release it can be unhooked in the usual manner.

The releasing of the knob under the conditions described is aided by the rounded outer corners of bosses 12, the flaring of ribs 13 at 16 and the greater freedom provided by recess $a^9$ in the bottom of the cavity bordered by flaring walls 16.

The features of my improved hook in the order of their relative importance are: Transverse grooves 18 in the bottom of jaws 11 and contiguous with space 15 therebetween to retain the cable when the nose of the log being hauled thereby is elevated; overhanging bosses 14 to embrace the knob when the cable and knob are being engaged with the hook in the presence of an abundance of cable slack; the backsetting of the longitudinal center line of the eyesleeve to the plane of the front surface of the backplate; and the enlargement of confining spaces and shaping of parts to make the disengagement of the cable and knob easy when the hook falls over front downward on the log. In these features and their useful combination my invention resides.

Having thus disclosed my improvement, what I claim as new therein and desire to secure by Letters Patent is,—

1. A choker hook consisting of jaws with a cable slot therebetween having a countersunk seat for a cable knob thereon, an eyesleeve above and proximate to said knob seat back-set therefrom over the junction of said jaws, and ribs spaced apart extending from said jaws to said eyesleeve integral therewith to receive a cable knob therebetween.

2. A choker hook consisting of jaws with a cable slot therebetween having laterally rounded cable grooves in the bottoms thereof and a countersunk cable-knob seat on the top thereof, an eyesleeve juxtaposed to said knob seat backset therefrom, ribs connecting said jaws with said eyesleeve integral therewith spaced apart for a cable knob therebetween, and arched inwardly-inclined lugs extending outwardly from said ribs integral with said eyesleeve to house said cable knob therebeneath.

3. A choker hook consisting of a backplate, an eyesleeve integral with one end of said backplate the longitudinal axis of which is in the plane of the front side of said backplate, and two jaws with a cable slot therebetween joined with said backplate and extended from the other end of said backplate forwardly as lugs therefrom having a countersunk knob seat on the side thereof opposite said eyesleeve the axis of said knobseat parallel with and disposed forwardly of said front side of said backplate.

4. A choker hook consisting of a backplate, an eyesleeve integral with one end of said backplate the longitudinal axis of which is in the plane of the front side of said backplate, two jaws with a cable slot therebetween extended forwardly from the other end of said back plate having a countersunk cable-knob seat on the side thereof opposite said eyesleeve the axis of which is parallel with said front side of said back plate and disposed forwardly thereof, and ribs extended on said backplate between said jaws and said eyesleeve integral therewith to receive said cable knob between them.

5. A choker hook consisting of a backplate, an eyesleeve integral with one end of said backplate the longitudinal axis of which is in the plane of the front side of said backplate, two jaws with a cable slot therebetween extended forwardly from the other end of said backplate having a countersunk cable-knob seat on the side thereof opposite said eyesleeve the axis of which is parallel with said front side of said backplate and disposed forwardly thereof, ribs extended on said backplate disposed forwardly therefrom between said jaws and said eyesleeve to receive a cable knob therebetween and lugs extended outwardly and arched toward each other from said ribs integral therewith and with said eyesleeve to house said cable knob.

6. A choker hook consisting of a backplate, an eyesleeve integral with one end of said backplate the longitudinal axis of which is in the plane of the front side of said backplate, two jaws with a cable slot therebetween extended forwardly from the other end of said backplate having a countersunk cable-knob seat on the side thereof opposite said eyesleeve the axis of which is parallel with said front side of said back plate the outer ends of which have lateral rounded cable grooves therein and the front sides of which are rounded next to said cable slot and on the outer ends, ribs extended on the front side of said backplate between said jaws and said eyesleeve spaced for a cable knob between them with flaring opposite sides midway between said jaws and said eyesleeve said front side of said backplate recessed juxtaposed said flaring ribs, and lugs extended forwardly from said ribs arching toward each other integral with said eyesleeve to house said cable knob.

7. A choker hook consisting of a back plate, an eye sleeve integral with one end of said back plate, two jaws spaced apart to receive a cable therebetween with their junction integral with the other end of said back plate having a countersunk cable knob seat on the inner sides thereof opposite said cable eye sleeve also having lateral grooves to receive said cable when bent in the outer sides of said jaws.

SYDNEY ASHDOWN.